S. G. SUPPLEE.
REINFORCED TOOTH CROWN.
APPLICATION FILED DEC. 31, 1910.

986,653.

Patented Mar. 14, 1911.

Witnesses:

Inventor
S. G. Supplee
By his Attorneys

UNITED STATES PATENT OFFICE.

SAMUEL G. SUPPLEE, OF EAST ORANGE, NEW JERSEY.

REINFORCED TOOTH-CROWN.

986,653.   Specification of Letters Patent.   Patented Mar. 14, 1911.

Application filed December 31, 1910. Serial No. 600,336.

*To all whom it may concern:*

Be it known that I, SAMUEL G. SUPPLEE, a citizen of the United States, residing at East Orange, Essex county, State of New Jersey, have invented certain new and useful Improvements in Reinforced Tooth-Crowns, of which the following is a full, clear, and exact description.

My invention relates to improvements in tooth crowns, particularly to metallic tooth crowns, the object being to reinforce the cusp portion thereof in such a manner as to resist wear and render the same more durable.

It is customary at present in the forming of metallic tooth crowns to form the same of gold, the cusp being properly contoured to articulate with the opposite co-acting tooth. Comparatively thin metal is employed for this purpose and to reinforce the cusp, the interior of the bottom of the cap or crown tooth is filled with solder to a substantial depth throughout. It is necessary, in following out this old method, to fill in the solder to such a depth as to cause it to stand well above the highest point within the cap, because experience has demonstrated that it is always this point that wears through first. Where the cap is filled as heretofore, the low points on the inside of the cusp (the high points on the outside) are reinforced much more than necessary, and to that extent relatively expensive material is wasted. Again by reason of filling the bottom of such a cap with solder to a substantial depth, it is frequently necessary to grind away the human tooth more than desirable in order that the cap may be applied and forced on to the proper extent. Furthermore, in flowing gold solder into a cap to reinforce the inner surface of the cusp, it is not always that a uniform contact is secured, but it frequently happens that in places the gold cusp is unreinforced, as would occur where there is a failure of union between the reinforcing element—the solder—and the inner surface of said cusp.

From various standpoints it is apparent that the method heretofore employed of reinforcing crown teeth has been crude, expensive, and in many respects, unsatisfactory.

The object of my invention is to provide a reinforcement which is uniform throughout the entire cusp area and in which a minimum amount of reinforcing material may be employed, said reinforcement occupying no more space than absolutely necessary to secure the said reinforcing effect, thereby relieving, in many cases, the necessity of grinding away to an undesirable extent the tooth which is to receive said crown.

Figure 2:
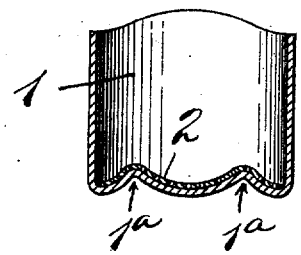
Figure 4:
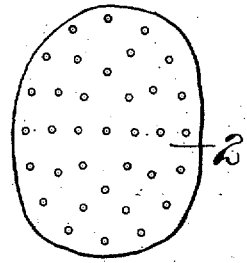
Figure 1:
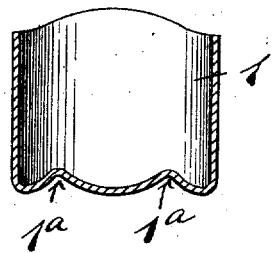
Figure 3:
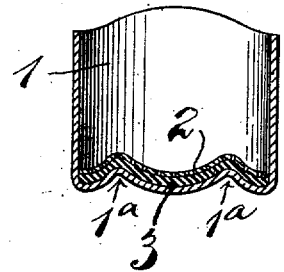
Figure 5:
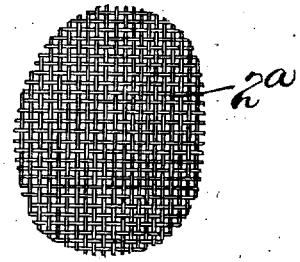

In the accompanying drawings, Figure 1 is a conventional illustration in longitudinal section of a crown tooth relatively enlarged. Fig. 2 is a similar view showing a part of the reinforcement in place. Fig. 3 is a similar view showing the finished crown. Fig. 4 is a plan view of one part of the reinforcement alone. Fig. 5 is a similar view of a modification.

1 represents the main body of a crown tooth, the same being of any desired contour proper for the particular tooth to which said crown is to be applied. 1ª 1ª represent the low parts of the exposed cusp portion of said crown tooth. It is these parts especially that practice demonstrates should be particularly well reinforced. To reinforce these parts, I provide a perforated or reticulated inside reinforcing plate or member 2, which is preferably properly contoured, or shaped to the inner surface of the cusp portion. This plate is placed within the tooth. Solder is then poured in, heat being likewise applied to the crown tooth itself. This solder flows through the perforations, or passages in the reticulated reinforcing member 2 so as to completely fill the space between said reinforcement and the inner surface of the cusp. In Fig. 3 I have shown in an exaggerated manner the presence of the solder in said space, said solder being conventionally illustrated at 3. The passages or reticulations in the reinforcing member 2 act as guide ducts to convey the solder uniformly to all parts of the surface to be reinforced, thereby guaranteeing a uniform deposit, even at the high inside points, thereby providing the low parts of the biting surface of the cusp with an adequate reinforcement so essential thereto. By reason of the presence of this plate, the solder is not permitted to form a puddle in any particular low point or points on the inside of the tooth, reinforcing the same to an unnecessary extent, and also resulting in a waste of material, but is distributed evenly over the entire surface, or substantially so.

Instead of using a perforated plate, as shown in Fig. 2, for the purpose of a reinforcement, I may use a fine wire mesh 2ª, conventionally shown in Fig. 5, said mesh furnishing a multitude of passages for the flow of the gold solder. By these improvements, I find that substantial economies are attained in that there is no superfluous reinforcing material applied at any one point or points. Further, by these improvements, a minimum amount of gold solder may be employed at the vital points, that amount corresponding to the minimum amount found necessary for adequate reinforcement at such points. By reason of this improvement, much material is saved, and further, by reason of this improvement, no valuable space within the crown tooth is occupied by the reinforcing material, thus making it possible to apply the crown to a human tooth with only a minimum amount of grinding away of the latter.

What I claim is:

1. In a crown tooth, an interior reinforcing element arranged to stand over the inner surface of the cusp portion thereof, said reinforcing element having a plurality of perforations or passages, and solder connecting said reinforcement to the inner surface of said cusp.

2. In a crown tooth, an interior reinforcing element arranged to stand over the inner surface of the cusp portion thereof, said reinforcing element having a plurality of perforations or passages, and solder connecting said reinforcement to the inner surface of said cusp, said reinforcing element being formed from wire mesh.

SAML. G. SUPPLEE.

Witnesses:
R. C. MITCHELL,
E. E. MORSE.

Copies of this patent may be obtained for five cents each, by addressing the "Commissioner of Patents. Washington, D. C."